United States Patent
Huang et al.

(10) Patent No.: US 11,418,793 B2
(45) Date of Patent: Aug. 16, 2022

(54) ADAPTIVE AFFINE MOTION VECTOR CODING

(71) Applicant: QUALCOMM Incorporated, San Diego, CA (US)

(72) Inventors: Han Huang, San Diego, CA (US); Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 16/591,455

(22) Filed: Oct. 2, 2019

(65) Prior Publication Data

US 2020/0112725 A1    Apr. 9, 2020

Related U.S. Application Data

(60) Provisional application No. 62/741,397, filed on Oct. 4, 2018.

(51) Int. Cl.
*H04N 19/139* (2014.01)
*H04N 19/105* (2014.01)
(Continued)

(52) U.S. Cl.
CPC ......... *H04N 19/139* (2014.11); *H04N 19/105* (2014.11); *H04N 19/122* (2014.11); *H04N 19/159* (2014.11); *H04N 19/176* (2014.11)

(58) Field of Classification Search
CPC .. H04N 19/139; H04N 19/105; H04N 19/176; H04N 19/122; H04N 19/159
See application file for complete search history.

(56) References Cited

U.S. PATENT DOCUMENTS

| | | | |
|---|---|---|---|
| 2010/0246676 A1* | 9/2010 | Cao | H04N 19/61 375/240.13 |
| 2013/0114722 A1* | 5/2013 | Koyama | H04N 19/16 375/240.16 |

(Continued)

OTHER PUBLICATIONS

Chen J., et al., "Algorithm Description of Joint Exploration Test Model 1," 1, JVET Meeting; Oct. 19, 2015-Oct. 21, 2015 Geneva;(The Joint Video Exploration Team of ISO/IEC JTC1/SC29/WG11 and ITU-T SG.16); URL: http://phenix.int-evrt.fr/jvet/, No. JVET-A1001 Feb. 24, 2016 (Feb. 24, 2016), XP030150000, 27 pages.

(Continued)

*Primary Examiner* — Shawn S An
(74) *Attorney, Agent, or Firm* — Shumaker & Sieffert, P.A.

(57) ABSTRACT

A video coding device is configured to determine control point motion vectors (CPMVs) for an affine motion predicted block of video data. For a four parameter affine model, two CPMVs may be positioned at any two corners of the current block, such as top-left and bottom-right or bottom-left; top-right and bottom-left or bottom-right; or bottom-left and bottom-right. For a six parameter affine model, three CPMVs may be positioned at any three corners of the current block, such as top-left, bottom-left, and bottom-right; top-right, bottom-left, and bottom-right; or top-left, top-right, and bottom-right. The video coder may further predict the CPMVs using motion information of neighboring blocks to the determined CPMVs, code the CPMVs, and code the current block using the CPMVs. The video coder may be a video encoder or a video decoder.

23 Claims, 11 Drawing Sheets

(51) Int. Cl.
*H04N 19/176* (2014.01)
*H04N 19/122* (2014.01)
*H04N 19/159* (2014.01)

(56) References Cited

U.S. PATENT DOCUMENTS

| | | | | |
|---|---|---|---|---|
| 2015/0237365 | A1* | 8/2015 | Takahashi | H04N 19/172 |
| | | | | 375/240.16 |
| 2017/0127058 | A1* | 5/2017 | Misra | H04N 19/44 |
| 2018/0027233 | A1* | 1/2018 | Merkle | H04N 19/157 |
| | | | | 375/240.12 |
| 2019/0208223 | A1* | 7/2019 | Galpin | H04N 19/139 |
| 2019/0246142 | A1* | 8/2019 | Zhao | H04N 19/132 |
| 2020/0077111 | A1* | 3/2020 | Chuang | H04N 19/517 |
| 2021/0006786 | A1* | 1/2021 | Gao | H04N 19/157 |
| 2021/0105481 | A1* | 4/2021 | Kim | H04N 19/137 |
| 2021/0127116 | A1* | 4/2021 | Chen | H04N 19/139 |

OTHER PUBLICATIONS

Ergen S., "ZigBee/IEEE 802.15.4 Summary", Sep. 10, 2004, 37 Pages.

IEEE Std 802.11 ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.

ITU-T H.265, "Series H: Audiovisual and Multimedia Systems, Infrastructure of audiovisual services—Coding of moving video. High efficiency video coding," The International Telecommunication Union. Dec. 2016, 664 Pages.

* cited by examiner

ADAPTIVE AFFINE MOTION VECTOR CODING

This application claims the benefit of U.S. Provisional Application No. 62/741,397, filed Oct. 4, 2018, the entire contents of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for coding blocks of video data using affine prediction. In particular, a video coder (such as a video encoder or video decoder) may determine control point motion vectors (CPMVs) to use to generate a prediction block for a current block of video data according to affine prediction, and also determine motion information of neighboring blocks near the CPMVs to predict the CPMVs. The video coder may also determine various motion vector difference (MVD) resolutions to be used when coding the CPMVs used to code the current block.

In one example, a method of coding (encoding or decoding) video data includes determining a number of control point motion vectors to be used to predict a current block of video data using inter-prediction according to an affine motion model; determining motion information of neighboring blocks to the current block to use to predict the control point motion vectors, wherein determining the motion information comprises: when the number of control point motion vectors is two, determining motion information of a neighboring block that neighbors a lower half of the current block to either the left or the right of the current block, or when the number of control point motion vectors is three, determining motion information of a neighboring block that neighbors the lower half of the current block to the right of the current block; coding the control point motion vectors using the determined motion information of the neighboring blocks; generating a prediction block for the current block using the control point motion vectors and using inter-prediction according to the affine motion model; and coding the current block using the prediction block.

In another example, a device for coding video data includes a memory configured to store video data; and one or more processors implemented in circuitry and configured to: determine a number of control point motion vectors to be used to predict a current block of video data using inter-prediction according to an affine motion model; determine motion information of neighboring blocks to the current block to use to predict the control point motion vectors, wherein to determine the motion information, the one or more processors are configured to: when the number of control point motion vectors is two, determine motion information of a neighboring block that neighbors a lower half of the current block to either the left or the right of the current block, or when the number of control point motion vectors is three, determine motion information of a neighboring block that neighbors the lower half of the current block to the right of the current block; code the control point motion vectors using the determined motion information of the neighboring blocks; generate a prediction block for the current block using the control point motion vectors and using inter-prediction according to the affine motion model; and code the current block using the prediction block.

In another example, a computer-readable storage medium has stored thereon instructions that, when executed, cause a processor to determine a number of control point motion vectors to be used to predict a current block of video data using inter-prediction according to an affine motion model; determine motion information of neighboring blocks to the current block to use to predict the control point motion vectors, wherein the instructions that cause the processor to determine the motion information comprise instructions that cause the processor to: when the number of control point motion vectors is two, determine motion information of a neighboring block that neighbors a lower half of the current block to either the left or the right of the current block, or when the number of control point motion vectors is three, determine motion information of a neighboring block that neighbors the lower half of the current block to the right of the current block; code the control point motion vectors using the determined motion information of the neighboring blocks; generate a prediction block for the current block using the control point motion vectors and using inter-prediction according to the affine motion model; and code the current block using the prediction block.

In another example, a device for coding video data includes means for determining a number of control point motion vectors to be used to predict a current block of video data using inter-prediction according to an affine motion model; means for determining motion information of neighboring blocks to the current block to use to predict the control point motion vectors, wherein determining the motion information comprises: means for determining, when the number of control point motion vectors is two, motion information of a neighboring block that neighbors a lower half of the current block to either the left or the right of the current block, or means for determining, when the number of control point motion vectors is three, motion information of a neighboring block that neighbors the lower half of the current block to the right of the current block; means for coding the control point motion vectors using the determined motion information of the neighboring blocks; means for generating a prediction block for the current block using the control point motion vectors and using inter-prediction according to the affine motion model; and means for coding the current block using the prediction block.

The details of one or more examples are set forth in the accompanying drawings and the description below. Other features, objects, and advantages will be apparent from the description, drawings, and the claims.

DETAILED DESCRIPTION

Figure 1:
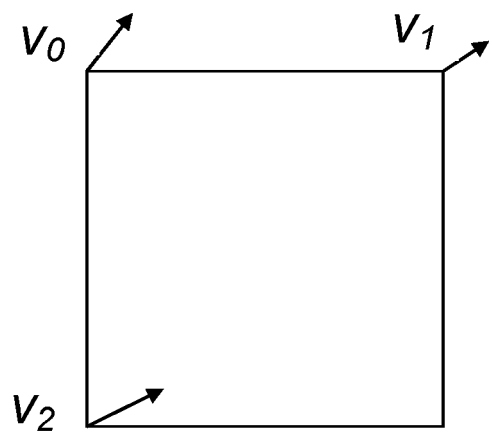
FIG. 1 is a conceptual diagram illustrating an example block predicted using a six parameter affine motion model.

FIG. 1 is a conceptual diagram illustrating an example block predicted using a six parameter affine motion model. An affine motion model may be described as $$\begin{cases} v_x = ax + by + e \\ v_y = cx + dy + f \end{cases} \qquad 1)$$

$(v_x, v_y)$ is the motion vector at the coordinate $(x, y)$, and $a$, $b$, $c$, $d$, $e$, and $f$ are the six parameters. The affine motion model for a block can also be described by the 3 motion vectors (MVs) $\vec{v}_0 = (v_{0x}, v_{0y})$, $\vec{v}_1 = (v_{1x}, v_{1y})$, and $\vec{v}_2 = (v_{2x}, v_{2y})$ at the 3 corners of the block as shown in FIG. 1. Wherein, $\vec{v}_0$ is at the top-left corner of the block, $\vec{v}_1$ is at the top-right corner of the block, and $\vec{v}_2$ is at the bottom-left corner of the block. The motion field is then described as $$\begin{cases} v_x = \frac{(v_{1x} - v_{0x})}{w}x + \frac{(v_{2x} - v_{0x})}{h}y + v_{0x} \\ v_y = \frac{(v_{1y} - v_{0y})}{w}x + \frac{(v_{2y} - v_{0y})}{h}y + v_{0y} \end{cases} \qquad 2)$$

where $w$ and $h$ are the width and height of the block. This affine motion model is an example 6-parameters affine motion model.

Figure 2:
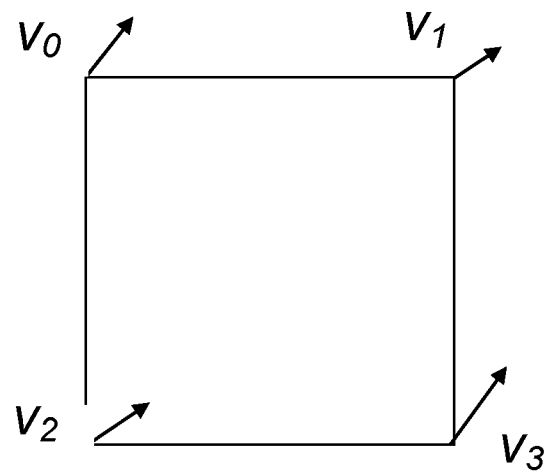
FIG. 2 is a conceptual diagram illustrating an example of a block predicted using a simplified four parameter affine motion model.

FIG. 2 is a conceptual diagram illustrating an example of a block predicted using a simplified four parameter affine motion model. A simplified 4-parameters affine model is described as $$\begin{cases} v_x = ax - by + e \\ v_y = bx + ay + f \end{cases} \qquad 3)$$

Similarly, the simplified 4-parameters affine model for a block can be described by 2 MVs $\vec{v}_0 = (v_{0x}, v_{0y})$ and $\vec{v}_1 = (v_{1x}, v_{1y})$ at the 2 corners of the block. The motion field is then described as $$\begin{cases} v_x = \frac{(v_{1x} - v_{0x})}{w}x - \frac{(v_{1y} - v_{0y})}{h}y + v_{0x} \\ v_y = \frac{(v_{1y} - v_{0y})}{w}x + \frac{(v_{1x} - v_{0x})}{h}y + v_{0y} \end{cases} \qquad 4)$$

In this disclosure, MV $\vec{v}_i$ may be referred to as a control point motion vector (CPMV or control point MV).

The control point MVs are not necessarily the same as in FIG. 1 or FIG. 2. Other control point MVs may also be selected. For a 4-parameter affine model, the control point pairs can be selected from any two of the $\{\vec{v}_0, \vec{v}_2, \vec{v}_3\}$ as shown in FIG. 2. For a 6-parameter affine model, the control point pairs can be selected from any three of MVs. Given the selected control point MVs, the other MV can be calculated by the derived affine motion model.

The affine motion model can also be represented by an anchor MV $\vec{v}_0$ at coordinate $(x_0, y_0)$, a horizontal delta MV $\nabla \vec{v}_h$ and a vertical delta MV $\nabla \vec{v}_v$. The MV $\vec{v}$ at the coordinate $(x, y)$ can be calculated as $\vec{v} = \vec{v}_0 + x * \nabla \vec{v}_h + y * \nabla \vec{v}_v$.

The CPMV representation can be converted to the representation with delta MVs. For example, $\vec{v}_0$ is the same as the top-left CPMV, $\nabla \vec{v}_h = (\vec{v}_1 - \vec{v}_0)/w$, $\nabla \vec{v}_v = (\vec{v}_2 - \vec{v}_0)/h$.

Note that the operations described above are vector operations, and the addition, division, and multiplication operations are applied element wise.

Figure 3:
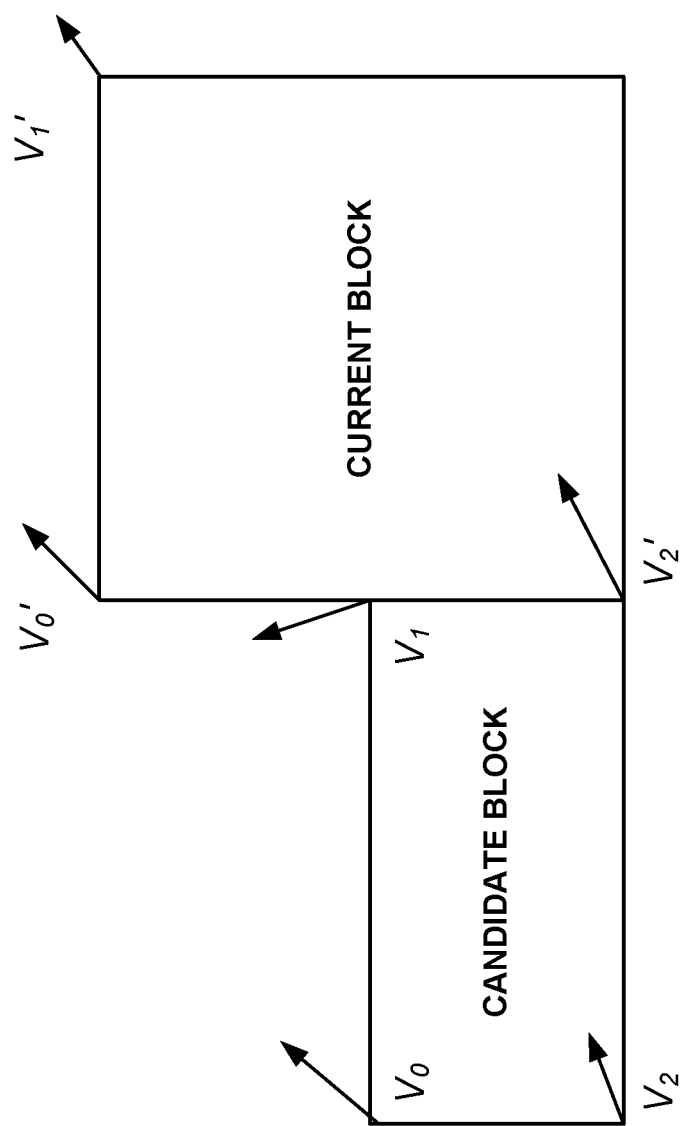
FIG. 3 is a conceptual diagram illustrating an example of a block predicted using a six parameter affine motion model using a neighboring candidate block.

FIG. 3 is a conceptual diagram illustrating an example of a block predicted using a six parameter affine motion model using a neighboring candidate block. As in the normal motion vector prediction techniques in HEVC, affine motion predictors can be derived from the affine motion vectors or normal motion vectors of the neighboring coded blocks. There are two popular types of affine motion predictors:

inherited affine motion vector predictors and constructed affine motion vector predictors.

The inherited affine motion vector predictor (MVP) uses the affine motion of a neighboring coded block to derive the predicted CPMVs of current block. It is assumed that the current block shares the same affine motion model as the neighboring coded block. The neighboring coded block is referred to as a candidate block. The candidate block can be selected from different spatial or temporal neighboring locations. An example is shown in FIG. 3. The affine motion vectors of the neighboring coded block A (represented as the motion vectors at the control-points) are: $\vec{v}_0=(v_{0x}, v_{0y})$, $\vec{v}_1=(v_{1x}, v_{1y})$, $\vec{v}_2=(v_{2x}, v_{2y})$, the size of candidate block A is (w, h), the coordinates of control points of the neighboring coded block A are (x0, y0), (x1, y1), and (x2, y2).

The predicted affine motion vectors $\vec{v}'_0=(v_{0x}', v_{0y}')$, $\vec{v}'_0=(v_{1x}', v_{1y}')$, $\vec{v}'_2=(v_{2x}', v_{2y}')$ at the control points of current block can be derived by replacing (x,y) in equation (2) with the coordinate difference between the control points of current block and the top-left control point of candidate A.

$$\begin{cases} v'_{0x} = \frac{(v_{1x}-v_{0x})}{w}(x0'-x0) + \frac{(v_{2x}-v_{0x})}{h}(y0'-y0) + v_{0x} \\ v'_{0y} = \frac{(v_{1y}-v_{0y})}{w}(x0'-x0) + \frac{(v_{2y}-v_{0y})}{h}(y0'-y0) + v_{0y} \end{cases} \quad 5)$$

$$\begin{cases} v'_{1x} = \frac{(v_{1x}-v_{0x})}{w}(x1'-x0) + \frac{(v_{2x}-v_{0x})}{h}(y1'-y0) + v_{0x} \\ v'_{1y} = \frac{(v_{1y}-v_{0y})}{w}(x1'-x0) + \frac{(v_{2y}-v_{0y})}{h}(y1'-y0) + v_{0y} \end{cases} \quad 6)$$

$$\begin{cases} v'_{2x} = \frac{(v_{1x}-v_{0x})}{w}(x2'-x0) + \frac{(v_{2x}-v_{0x})}{h}(y2'-y0) + v_{0x} \\ v'_{2y} = \frac{(v_{1y}-v_{0y})}{w}(x2'-x0) + \frac{(v_{2y}-v_{0y})}{h}(y2'-y0) + v_{0y} \end{cases} \quad 7)$$

wherein (x0', y0'), (x1', y1'), and (x2', y2') are the coordinates of control-points in current block. If represented as delta MVs, $\vec{v}'_0=v_{0x}+(x0'-x0)*\nabla\vec{v}_h+(y0'-y0)*\nabla\vec{v}_v$, $\vec{v}'_1=v_{0x}+(x1'-x0)*\nabla\vec{v}_h+(y1'-y0)*\nabla\vec{v}_v$, $\vec{v}'_2=v_{0x}+(x2'-x0)*\nabla\vec{v}_h+(y2'-y0)*\nabla\vec{v}_v$.

Similarly, if the neighboring coded block's affine model is a 4-parameter affine model, then the equation (4) may be applied.

If the affine model for the current block is a 4-parameter affine model, then equation (7) can be ignored.

Figure 4:
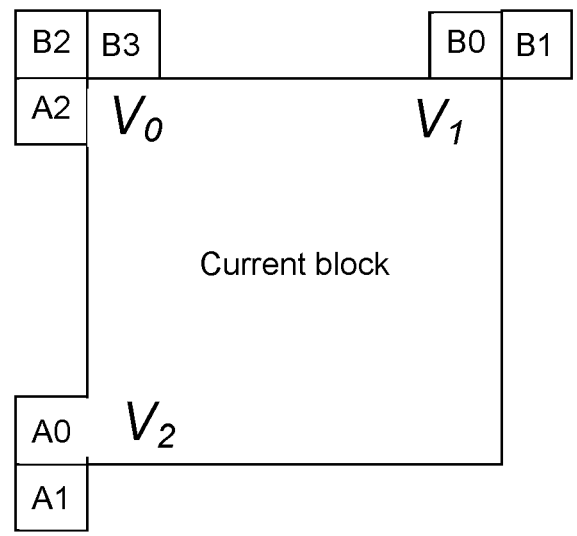
FIG. 4 is a conceptual diagram illustrating an example block with various neighboring blocks.

FIG. 4 is a conceptual diagram illustrating an example block with various neighboring blocks. The candidate block of FIG. 3 may instead be positioned at any of A0, B0, B1, A1, or B2, as shown in FIG. 4.

The constructed affine motion vector predictor may be derived according to the following techniques. For example, as shown in FIG. 4, the $\vec{v}_0$ at the top-left control point can be predicted by the motion vector at B2, B3 or A3, the $\vec{v}_2$ at the top-right control point can be predicted by the motion vector at B0 or B1, the $\vec{v}_2$ at the left-bottom control point can be predicted by the motion vector at A0 or A1.

The motion information can include a MV and a reference picture index to indicate which reference picture is used for prediction. In the case that bi-prediction is allowed, a MV and a reference picture index may be used for each prediction direction. In addition, an inter-prediction direction is used to indicate the prediction direction: forward prediction, backward prediction, or bi-prediction. In this disclosure, the term "motion vector" (MV) may be used interchangeably to represent a single MV or all of the motion information required for an inter prediction of a block.

In the Advanced Motion Vector Prediction (AMVP) mode, the MV is represented by a motion vector predictor (MVP) and a motion vector difference (MVD). An MVP index is also used to indicate the selected MVP in a motion vector prediction candidate list. The MVP can be derived from neighboring coded blocks, and is referred to as an AMVP candidate.

In the case of 6-parameter affine coded block, the MVP and the MVD both include 3 MVs. In the case of 4-parameter affine coded block, the MVP and the MVD both include 2 MVs.

In the merge mode, the motion information is represented only by an index of MVP. The MVP in merge is referred to as a merge candidate. The index is referred to as a merge index and is used to indicate the selected merge candidate in a merge candidate list.

Figure 5:
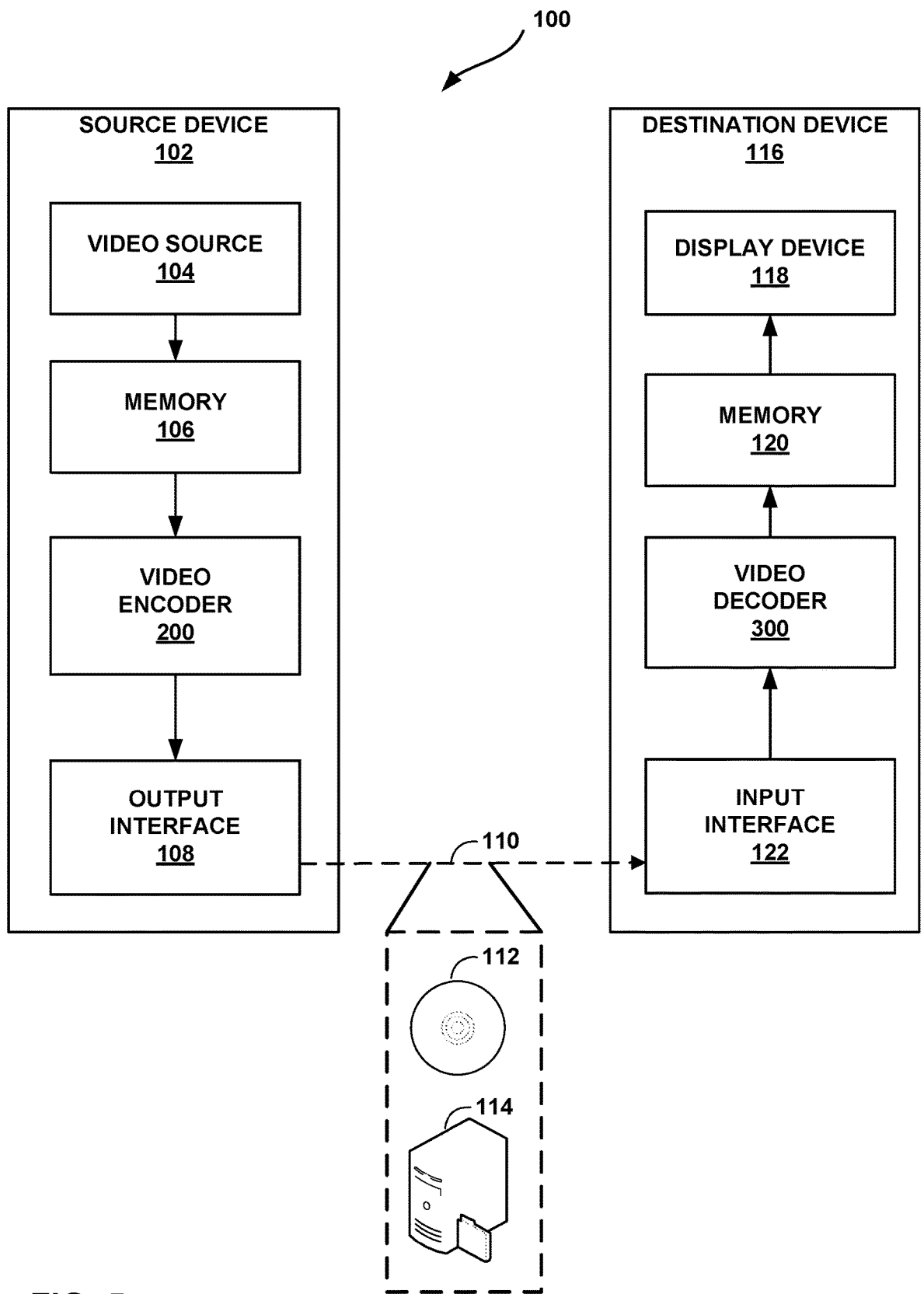
FIG. 5 is a block diagram illustrating an example video encoding and decoding system that may perform the techniques of this disclosure.

FIG. 5 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 5, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 5, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for performing affine prediction of this disclosure. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 5 is merely one example. In general, any digital video encoding and/or decoding device may perform techniques for performing affine prediction of this disclosure. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream of computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 5, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and video decoder 300 may adaptively determine motion vector difference (MVD) resolution for affine AMVP mode. The MVD resolution can be selected from 1/16 pixel, 1/8 pixel, 1/2 pixel, 1/4 pixel, or integer pixel resolution, four-pixel resolution etc. Also in accordance with these techniques, video encoder 200 and video decoder 300 may perform adaptive selection of control point motion vectors (CPMVs), wherein the locations of CPMVs are determined depending on the selected affine MVP.

In some examples, video encoder 200 and video decoder 300 may determine MVD resolution implicitly, e.g., according to block size. That is, video encoder 200 and video decoder 300 may determine the block size, and then execute a function that takes the block size as an input. In this manner, video encoder 200 and video decoder 300 may determine the resolution of the MVD as a function of the block size, without coding data directly representing the resolution. In some examples, high resolution MVDs may be applied to small block sizes, and low resolution MVDs may be applied to large block sizes. The variables W and H specify the width and height of a block coded in affine AMVP mode, respectively.

In one example, the MVD resolution for all CPMVs is the same and is determined by a calculated value S, where S=min(W,H) for 6-parameter affine model and S is the size of CPMV side for 4-parameter affine model. Min( ) is an operator to choose the minimum value. For 4-parameter affine model, if the CPMVs locate at the top-left corner and top-right corner, S=W; if the CPMVs locate at the top-left corner and bottom-left corner, S=H.

Video encoder 200 and video decoder 300 may determine MVD resolution as:

$$r = \begin{cases} \frac{1}{1 \ll (7 - \log_2 S)}, & S \leq 128 \\ 1, & S > 128 \end{cases}$$

In another example, the MVD resolution for all CPMVs is the same and is determined by S, where S is defined the same as above. Video encoder 200 and video decoder 300 may determine MVD resolution as:

If $S >= TH0$

The MVD resolution is set as $\frac{1}{1 \ll r0}$.

Else if $S <= TH1$

The MVD resolution is set as $\frac{1}{1 \ll r2}$.

Else

The MVD resolution is set as $\frac{1}{1 \ll r1}$.

Wherein $TH0 > TH1$, $r0 < r1 < r2$.

In some examples, TH0=64, TH1=16, r0=0, r1=2, and r2=4.

In some examples, TH0=64, TH1=16, r0=0, r1=2, and r2=3.

In some examples, other values of TH0, TH1, r0, r1, and r2 may be applied.

In some examples, only two MVD resolutions are available, and video encoder 200 and video decoder 300 may determine MVD resolution as:

If $S >= TH0$

The MVD resolution is set as $\frac{1}{1 \ll r0}$.

Else

The MVD resolution is set as $\frac{1}{1 \ll r1}$.

In another example, the MVD resolution for all CPMVs may not be the same, the MVD resolution for top-left CPMV may be fixed and equal to r0, the MVD resolution for the top-right CPMV r1 may be determined according to W, and the MVD resolution for bottom-left CPMV r2 may be determined according to H. In particular, video encoder 200 and video decoder 300 may determine r1 and 42 as:

$$r1 = \begin{cases} \frac{1}{1 \ll (7 - \log_2 W)}, & W \le 128 \\ 1, & W > 128 \end{cases}$$

$$r2 = \begin{cases} \frac{1}{1 \ll (7 - \log_2 H)}, & H \le 128 \\ 1, & H > 128 \end{cases}$$

R0 may be predefined, and can be equal to 2, or another integer value.

In another example, the MVD resolution for all CPMVs may not be the same, the MVD resolution for top-left CPMV is fixed and equal to 2, or another integer value, the MVD resolution for the top-right CPMV is determined by W, and the MVD resolution for bottom-left CPMV is determined by H. Video encoder 200 and video decoder 300 may determine MVD resolution as:

If $S >= TH0$

The MVD resolution is set as $\frac{1}{1 \ll r0}$.

Else if $S <= TH1$

The MVD resolution is set as $\frac{1}{1 \ll r2}$.

Else

The MVD resolution is set as $\frac{1}{1 \ll r1}$.

Wherein r0<r1<r2, TH0>TH1, S=W for the top-right CPMV and S=H for bottom-left CPMV.

In another example, the MVD resolution for all CPMVs may not be the same, the MVD resolution for top-left CPMV is fixed and equal to 2, or another integer value, the MVD resolution for the top-right CPMV is determined by W, and the MVD resolution for bottom-left CPMV is determined by H. Video encoder 200 and video decoder 300 may determine MVD resolution as:

If $S >= TH0$

The MVD resolution is set as $\frac{1}{1 \ll r0}$.

Else

The MVD resolution is set as $\frac{1}{1 \ll r1}$.

Wherein r0<r1, S=W for the top-right CPMV and S=H for bottom-left CPMV.

In the various examples above, the MVP of the CPMV may be rounded according to the selected MVD resolution. Alternatively, the MVP of the CPMV is not rounded, and is always in a predefined resolution, for example, 1/16 or 1/4 pixel.

In some examples, video encoder 200 and video decoder 300 may code an MVD resolution index value representing the resolution of the MVD. Thus, the MVD resolution of the first CPMV may be determined by the value of mvd_res_idx that is coded in the bitstream, and the MVD resolution of the second CPMVs is determined by S, wherein S is equal to W if the second CPMV and the first CPMV locate at the horizontal boundary of the block, and S is equal to H if the second CPMV and the first CPMV locate at the vertical boundary of the block. For example, the first CPMV is at the top-left, then S=W if the second CPMV is at the top-right corner and S=H if the second CPMV is at the bottom-left corner.

In some examples, the MVD resolution of the second CPMV is determined by $$r1 = \begin{cases} \frac{1}{1 \ll (7 - \log_2 S)}, & S \le 128 \\ 1, & S > 128 \end{cases}$$

In some examples, the MVD resolution of the second CPMV is determined as follows:

If $S >= TH0$

The MVD resolution is set as $\frac{1}{1 \ll r0}$.

Else if $S <= TH1$

The MVD resolution is set as $\frac{1}{1 \ll r2}$.

Else

The MVD resolution is set as $\frac{1}{1 \ll r1}$.

Wherein TH0>TH1, r0<r1<r2.

In still another example, the MVD resolution of the second CPMV is determined as follows:

If $S >= TH0$

The MVD resolution is set as $\frac{1}{1 \ll r0}$.

Else

The MVD resolution is set as $\frac{1}{1 \ll r1}$.

Wherein r0 <r1.

In some examples, mvd_res_idx equal to 0 specifies MVD resolution of the first

CPMV is $\frac{1}{1 \ll r0}$, and mvd_res_idx equal to 1 specifies MVD resolution of the first CPMV is $\frac{1}{1 \ll r1}$.

In some examples, r0=2 and r1=4. In some examples, r0=2 and r1=3. In some examples, r0=2 and r1=1. In some examples, r0=2 and r1=0. In some examples, r0=2 and r1=4. Other combinations of r0, r1 and r2 may also be applied.

In some examples, mvd_res_idx equal to 0 specifies MVD resolution of the first

CPMV is $\frac{1}{1 \ll r0}$, mvd_res_idx equal to 1 specifies MVD resolution of the first CPMV is $$\frac{1}{1 \ll r1},$$

and mvd_res_idx equal to 2 specifies MVD resolution of the first CPMV is $$\frac{1}{1 \ll r2}.$$

In some examples, r0=2, r1=4 and r2=0. In some examples, r0=2, r1=3 and r2=0. Other combinations of r0, r1 and r2 may also be applied.

In some examples, the MVD resolution for all CPMVs is the same and is determined by S and mvd_res_idx. mvd_res_idx equals 0 specifies MVD resolution is $$\frac{1}{1 \ll r0},$$

and mvd_res_idx equals 1 specifies MVD resolution is $$\frac{1}{1 \ll r1}.$$

The value of r0 is predefined as 2 or another integer value, and r1 is determined by S, wherein S is as defined above.

In some examples, r1 is derived as follows.
If S>=TH0
  r1=x0.
Else
  r1=x1.
Wherein x0<x1. In some examples, x0=0 and x1=4. In some examples, x0=0, x1=1. In some examples, x0=0 and x1=3. In some examples, x0=1 and x1=4. In some examples, x0=1 and x1=3. Other combinations of x0 and x1 may be applied.

In some examples, r1 is derived as follows:
If S>=TH0
  r1=x0.
Else if S<=TH1
  r1=x2.
Else
  r1=x1.
Wherein x0<x1<x2. In some examples, x0=0, x1=1, and x2=4. In some examples, x0=0, x1=1, and x2=3. In some examples, x0=0, x1=3, and x2=4. In some examples, x0=1, x1=3, and x2=4. Other combinations of x0, x1, and x2 may be applied.

In some examples, the MVP of the CPMV may be rounded according to the selected MVD resolution. In other examples, the MVP of the CPMV is not rounded, and is always in a predefined resolution, for example, 1/16 or 1/4 pixel.

In a typical 6-parameter affine motion model, the locations for the 3 CPMVs can be any 3 among 4 corners of the block. In a typical 4-parameter affine motion model, the locations for the 2 CPMVs can be any 2 among the 4 corners of the block. The corners of the block are the top-left corner (TL), top-right corner (TR), bottom-left corner (BL) and bottom-right corner (BR). Let (x0,y0) specifies the coordinate of the top-left pixel of the block. W specifies the width of the block and H specifies the height of the block.

In one example, TL is the location (x0, y0), TR is the location (x0+W−1, y0), BL is the location (x0, y0+H−1), and BR is the location (x0+W−1, y0+H−1).

In another example, TL is the location (x0, y0), TR is the location (x0+W, y0), BL is the location (x0, y0+H), and BR is the location (x0+W, y0+H).

In still another example, the corners refer to the center of the corner subblocks, then TL is the location (x0+subBlkW/2, y0+subBlkH/2), TR is the location (x0+W−subBlkW/2, y0+subBlkH/2), BL is the location (x0+subBlkW/2, y0+H−subBlkH/2), and BR is the location (x0+W−subBlkW/2, y0+H−subBlkH/2), wherein subBlkW specifies the width of the subblock and subBlkH specifies the height of the subblock.

In another way of description, the MVs at the 4 corners $\vec{v}_i$, i=0,1,2,3, as shown in FIG. 5, are all referred to CPMVs, then the problem is changed to choose 3 CPMVs from the 4 for 6-parameter affine motion model and choose 2 CPMVs from the 4 for 4-parameter affine motion model. In the following description any definition of the TL, TR, BL, and BR can be applied. And the term "choose locations" and "choose CPMVs" may be used interchangeably.

Figure 6:
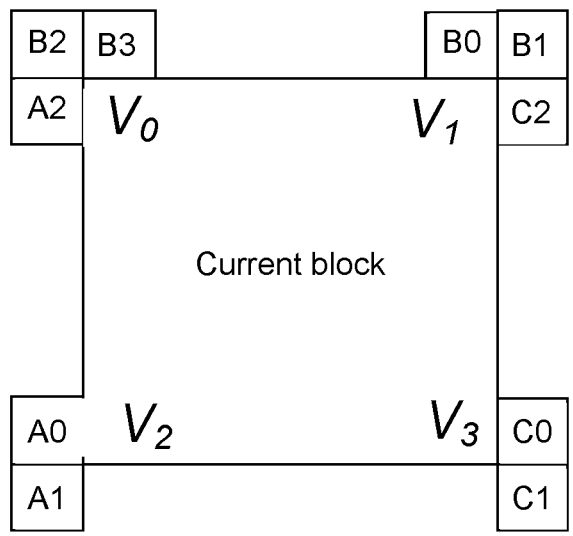
FIG. 6 is a conceptual diagram illustrating examples of neighboring blocks to a current block that may be used for MVP selection.

FIG. 6 is a conceptual diagram illustrating examples of neighboring blocks to a current block that may be used for MVP selection. In the techniques of this disclosure, the locations for CPMVs may depend on the selected affine MVP. In general, if the affine MVP is an inherited affine MVP from a spatial neighboring coded block, then the locations that are closer to the spatial neighboring block may be used. If the affine MVP is a constructed affine MVP, then the CPMVs of the constructed affine MVP may be chosen. Otherwise, the default locations may be used.

In one example, the default locations are TL, TR, and BL for 6-parameter affine motion model, and TL and TR for 4-parameter affine motion model. However, other CPMV locations may be used. For example, a video coder, such as video encoder 200 or video decoder 300, may use any two CPMVs for the 4-parameter affine motion model and any three CPMVs for the 6-parameter affine motion model. Thus, for the 4-parameter affine motion model, the video coder may select any of $V_0$ and $V_1$; $V_0$ and $V_2$; $V_0$ and $V_3$; $V_1$ and $V_2$; $V_1$ and $V_3$; or $V_2$ and $V_3$. For the 6-parameter affine motion model, the video coder may select any of $V_0$, $V_1$, and $V_2$; $V_0$, $V_1$, and $V_3$; $V_0$, $V_2$, and $V_3$; or $V_1$, $V_2$, and $V_3$.

The video coder (e.g., video encoder 200 and/or video decoder 300) may further select motion information of neighboring blocks to the CPMVs to use to predict the CPMVs. For example, when $V_0$ is one of the CPMVs, the video coder may select motion information of one of A2, B2, or B3 to use to predict $V_0$. When $V_1$ is one of the CPMVs, the video coder may select motion information of one of B0, B1, or C2 to use to predict $V_1$. When $V_2$ is one of the CPMVs, the video coder may select motion information of one of A0 or A1 to use to predict $V_2$. When $V_3$ is one of the CPMVs, the video coder may select one of C0 or C1 to use to predict $V_3$.

The following describes different cases for the inherited affine MVP, and the CPMVs may be chosen accordingly:

The inherited affine MVP is derived from A0 or A1
  In one example, the CPMVs for the 4-parameter affine motion model are $\vec{v}_2$ and $\vec{v}_0$.
  In another example, the CPMVs for the 4-parameter affine motion model are $\vec{v}_2$ and $\vec{v}_3$.
  In still another example, the CPMVs for the 4-parameter affine motion model further depends on the width and height of the current block, if width >height, the CPMVs are $\vec{v}_2$ and $\vec{v}_0$, otherwise, $\vec{v}_2$ and $\vec{v}_3$.
  Note that in all examples, $\vec{v}_2$ is chosen, since A0 and A1 are the immediate neighbors of BL corner.

The inherited affine MVP is derived from B0 or B1
  In one example, the CPMVs for the 4-parameter affine motion model are $\vec{v}_1$ and $\vec{v}_0$.
  In another example, the CPMVs for the 4-parameter affine motion model are $\vec{v}_1$ and $\vec{v}_3$.
  In still another example, the CPMVs for the 4-parameter affine motion model further depends on the width and height of the current block, if width >height, the CPMVs are $\vec{v}_1$ and $\vec{v}_3$, otherwise, $\vec{v}_1$ and $\vec{v}_0$.
  Note that in all examples, $\vec{v}_1$ is chosen, since B0 and B1 are the immediate neighbors of TR corner.

The inherited affine MVP is derived from B2 or B3 or A2
  In one example, the CPMVs for the 4-parameter affine motion model are $\vec{v}_0$ and $\vec{v}_1$.
  In another example, the CPMVs for the 4-parameter affine motion model are $\vec{v}_1$ and $\vec{v}_2$.
  In still another example, the CPMVs for the 4-parameter affine motion model further depends on the width and height of the current block, if width >height, the CPMVs are $\vec{v}_0$ and $\vec{v}_2$ otherwise, $\vec{v}_0$ and $\vec{v}_1$.
  Note that in all examples, $\vec{v}_0$ is chosen, since B2, B3 and A2 are the immediate neighbors of TL corner.

The inherited affine MVP is derived from temporal collocated block of the BR corner
  In one example, The CPMVs for the 4-parameter affine motion model are $\vec{v}_3$ and $\vec{v}_1$.
  In another example, The CPMVs for the 4-parameter affine motion model are $\vec{v}_3$ and $\vec{v}_2$.
  In still another example, the CPMVs for the 4-parameter affine motion model further depends on the width and height of the current block, if width >height, the CPMVs are $\vec{v}_3$ and $\vec{v}_1$, otherwise, $\vec{v}_3$ and $\vec{v}_2$.

In these examples, $\vec{v}_3$ is chosen, since temporal collocated block is at the BR corner. The examples in different inherited affine MVP cases may be combined.

In the case of flexible coding order, wherein the blocks at C0, C1 and C2 may be coded before current block, and the blocks at A0, A1 and A2 are not yet coded. The following shows different cases for the inherited affine MVP, and the CPMVs may be chosen accordingly.

The inherited affine MVP is derived from C0, C1
  In one example, the CPMVs for the 4-parameter affine motion model are $\vec{v}_3$ and $\vec{v}_1$.
  In another example, the CPMVs for the 4-parameter affine motion model are $\vec{v}_3$ and $\vec{v}_2$.
  In still another example, the CPMVs for the 4-parameter affine motion model further depends on the width and height of the current block, if width >height, the CPMVs are $\vec{v}_3$ and $\vec{v}_1$, otherwise, $\vec{v}_3$ and $\vec{v}_2$.
  Note that in all examples, $\vec{v}_3$ is chosen, since C0 and C1 are the immediate neighbors of BR corner.

The inherited affine MVP is derived from B0 or B1 or C2
  In one example, the CPMVs for the 4-parameter affine motion model are $\vec{v}_1$ and $\vec{v}_0$.
  In another example, the CPMVs for the 4-parameter affine motion model are $\vec{v}_1$ and $\vec{v}_3$.
  In still another example, the CPMVs for the 4-parameter affine motion model further depends on the width and height of the current block, if width >height, the CPMVs are $\vec{v}_1$ and $\vec{v}_3$, otherwise, $\vec{v}_1$ and $\vec{v}_0$.
  Note that in all examples, $\vec{v}_1$ is chosen, since B0, B1 and C2 are the immediate neighbors of TR corner.

The inherited affine MVP is derived from B2 or B3
  In one example, the CPMVs for the 4-parameter affine motion model are $\vec{v}_0$ and $\vec{v}_1$.
  In another example, the CPMVs for the 4-parameter affine motion model are $\vec{v}_0$ and $\vec{v}_2$.
  In still another example, the CPMVs for the 4-parameter affine motion model further depends on the width and height of the current block, if width >height, the CPMVs are $\vec{v}_0$ and $\vec{v}_2$ otherwise, $\vec{v}_0$ and $\vec{v}_1$.
  Note that in all examples, $\vec{v}_0$ is chosen, since B2 and B3 are the immediate neighbors of TL corner.

The inherited affine MVP is derived from temporal collocated block of the BL corner
  In one example, The CPMVs for the 4-parameter affine motion model are $\vec{v}_2$ and $\vec{v}_1$.
  In another example, The CPMVs for the 4-parameter affine motion model are $\vec{v}_2$ and $\vec{v}_0$.
  In still another example, the CPMVs for the 4-parameter affine motion model further depends on the width and height of the current block, if width >height, the CPMVs are $\vec{v}_2$ and $\vec{v}_0$, otherwise, $\vec{v}_2$ and $\vec{v}_1$.

In each of these examples, $\vec{v}_2$ is chosen, since temporal collocated block is at the BL corner. The examples in different inherited affine MVP cases may be combined.

The following shows different cases for the inherited affine MVP, and the CPMVs are chosen accordingly.

1) The inherited affine MVP is derived from A0 or A1
   The CPMVs for the 6-parameter affine motion model are $\vec{v}_2$, $\vec{v}_0$ and $\vec{v}_3$.
2) The inherited affine MVP is derived from B0 or B1
   The CPMVs for the 6-parameter affine motion model are $\vec{v}_1$, $\vec{v}_0$ and $\vec{v}_3$.
3) The inherited affine MVP is derived from B2 or B3 or A2
   The CPMVs for the 4-parameter affine motion model are $\vec{v}_0$, $\vec{v}_1$ and $\vec{v}_2$.
4) The inherited affine MVP is derived from temporal collocated block of the BR corner The CPMVs for the 4-parameter affine motion model are $\vec{v}_3$, $\vec{v}_1$ and $\vec{v}_2$.

In the case of flexible coding order, wherein the blocks at C0, C1 and C2 may be coded before current block, and the blocks at A0, A1 and A2 are not yet coded. The following shows different cases for the inherited affine MVP, and the CPMVs are chosen accordingly.
1) The inherited affine MVP is derived from B0 or B1 or C2
   The CPMVs for the 6-parameter affine motion model are $\vec{v}_1$, $\vec{v}_0$ and $\vec{v}_3$.
2) The inherited affine MVP is derived from B2 or B3
   The CPMVs for the 4-parameter affine motion model are $\vec{v}_0$, $\vec{v}_1$ and $\vec{v}_2$
3) The inherited affine MVP is derived from C0 or C1
   The CPMVs for the 4-parameter affine motion model are $\vec{v}_3$, $\vec{v}_1$ and $\vec{v}_2$.
4) The inherited affine MVP is derived from temporal collocated block of the BL corner The CPMVs for the 4-parameter affine motion model are $\vec{v}_2$, $\vec{v}_0$ and $\vec{v}_3$ In some examples, MVD prediction may be applied, wherein the MVD of a first CPMV is used to further predict the MVD of a second CPMV. The MVD prediction can also be based on the selected affine MVP, i.e. the first CPMV is chosen based on the selected affine MVP. If the affine MVP is inherited affine MVP, then the first CPMV is chosen such that the neighboring block is the immediate neighbor of the first CPMV. Otherwise, the default CPMV is used as CPMV, typically it can be $\vec{v}_0$, but it can also be other predefined CPMV. The selection of other CPMVs may be fixed, or may be also based on the affine MVP as described in section 3.3.1 and section 3.3.2. The MVD of other CPMV is predicted by the MVD of the first CPMV.

Let MVP0 denote the MVP of first CPMV, and MVP1 denotes the MVP of the second CPMV, MVD0 denotes the MVD of the first CPMV and MVD1 denotes the MVD of the second CPMV. Then the final MVD1' that is coded in the bitstream is derived by MVD1-MVD0. The reconstructed MV of the second CPMV is MVP1+MVD1'+MVD0.

The following shows different cases for the inherited affine MVP, and the first CPMV is chosen accordingly.

If the inherited affine MVP is derived from A0 or A1, the first CPMV is $\vec{v}_2$.

If the inherited affine MVP is derived from B0 or B1, the first CPMV is $\vec{v}_1$.

If the inherited affine MVP is derived from B2 or B3 or A2, the first CPMV is $\vec{v}_0$.

If the inherited affine MVP is derived from temporal collocated block of the BR corner, the first CPMV is $\vec{v}_3$.

In the case of flexible coding order, wherein the blocks at C0, C1 and C2 may be coded before current block, and the blocks at A0, A1 and A2 are not yet coded. The following shows different cases for the inherited affine MVP, and the first CPMV is chosen accordingly.

If the inherited affine MVP is derived from B0 or B1 or C2, the first CPMV is $\vec{v}_1$.

If the inherited affine MVP is derived from B2 or B3, the first CPMV is $\vec{v}_0$.

If the inherited affine MVP is derived from C0 or C1, the first CPMV is $\vec{v}_3$.

If the inherited affine MVP is derived from temporal collocated block of the BL corner, the first CPMV is $\vec{v}_2$.

The affine motion model can also be represented by an anchor MV $\vec{v}_0$ at coordinate $(x_0, y_0)$, a horizontal delta MV $\nabla\vec{v}_h$ and a vertical delta MV $\nabla\vec{v}_v$. The MV $\vec{v}$ at the coordinate $(x, y)$ can be calculated as $\vec{v}=\vec{v}_0+x*\nabla\vec{v}_h+y*\nabla\vec{v}_v$.

The anchor MV can be any of the CPMVs or the MV at the center of the current block. The selection of the anchor MV can be based on the selected affine MVP. If the affine MVP is inherited affine MVP, then the anchor MV is chosen such that the neighboring block is the immediate neighbor of the anchor MV. Otherwise, the default CPMV is used as CPMV, typically it can be $\vec{v}_0$, but it can also be other predefined CPMV or the center MV of the current block.

The following shows different cases for the inherited affine MVP, and the anchor CPMV is chosen accordingly.

If the inherited affine MVP is derived from A0 or A1, the anchor CPMV is $\vec{v}_2$.

If the inherited affine MVP is derived from B0 or B1, the anchor CPMV is $\vec{v}_1$.

If the inherited affine MVP is derived from B2 or B3 or A2, the anchor CPMV is $\vec{v}_0$.

If the inherited affine MVP is derived from temporal collocated block of the BR corner, the anchor CPMV is $\vec{v}_3$.

In the case of flexible coding order, wherein the blocks at C0, C1 and C2 may be coded before current block, and the blocks at A0, A1 and A2 are not yet coded. The following shows different cases for the inherited affine MVP, and the anchor CPMV is chosen accordingly.

If the inherited affine MVP is derived from B0 or B1 or C2, the anchor CPMV is $\vec{v}_1$.

If the inherited affine MVP is derived from B2 or B3, the anchor CPMV is $\vec{v}_0$.

If the inherited affine MVP is derived from C0 or C1, the anchor CPMV is $\vec{v}_3$.

If the inherited affine MVP is derived from temporal collocated block of the BL corner, the anchor CPMV is $\vec{v}_2$.

In the example of FIG. 6, CPMVs $V_2$ and $V_3$ represent examples of CPMVs in a lower half of the current block. In particular, $V_2$ is at a lower-left corner of the current block and $V_3$ is at a lower-right corner of the current block. In order to predict these CPMVs, the video coder (video encoder 200 or video decoder 300) may select motion information of a neighboring block that neighbors a lower half of the current block, to either the left or the right of the current block. In the example of FIG. 6, neighboring blocks A0 and A1 represent examples of neighboring blocks that neighbor the lower half of the current block to the left of the current block, while blocks C0 and C1 represent examples of neighboring blocks that neighbor the lower half of the current block to the right of the current block.

Accordingly, when a number of CPMVs is two (e.g., for the 4-parameter affine motion model), video encoder 200 or video decoder 300 may determine motion information of a neighboring block that neighbors a lower half of the current block to either the left or the right of the current block and use that motion information to predict and code a CPMV of the current block. For example, if $V_2$ is one of the CPMVs, video encoder 200 or video decoder 300 may select information of one of A0 or A1 to use to predict and code $V_2$. As another example, if $V_3$ is one of the CPMVs, video encoder 200 or video decoder 300 may select information of one of C0 or C1 to use to predict and code $V_3$.

Similarly, when a number of CPMVs is three (e.g., for the 6-parameter affine motion model), video encoder 200 may determine motion information of a neighboring block that neighbors the lower half of the current block to the right of the current block (e.g., one of C0 or C1) and use that motion information to predict and code V3 as a CPMV.

Figure 7A:
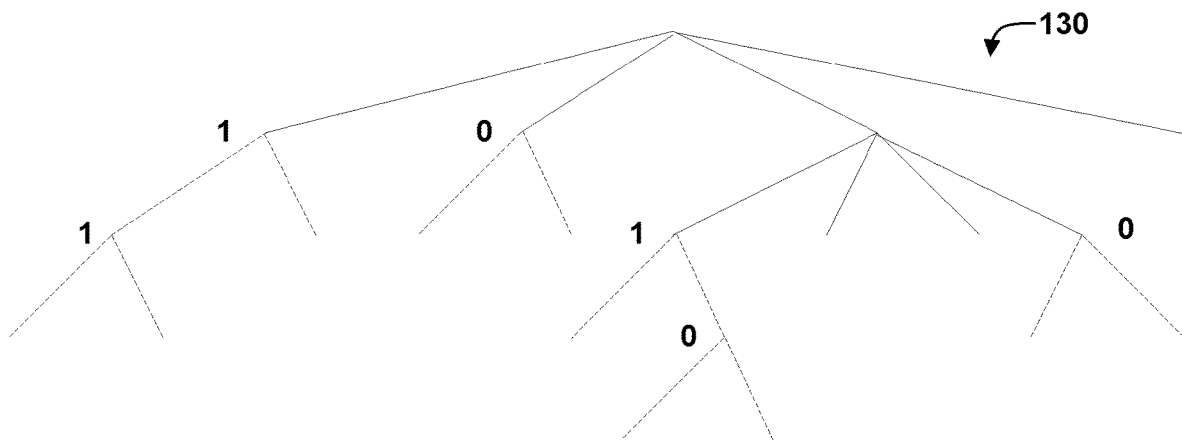
FIGS. 7A and 7B are conceptual diagrams illustrating an example quadtree binary tree (QTBT) structure, and a corresponding coding tree unit (CTU).
Figure 7B:
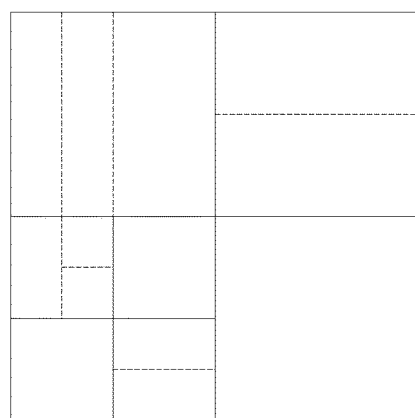

FIGS. 7A and 7B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 7B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, the leaf quadtree node will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 8:
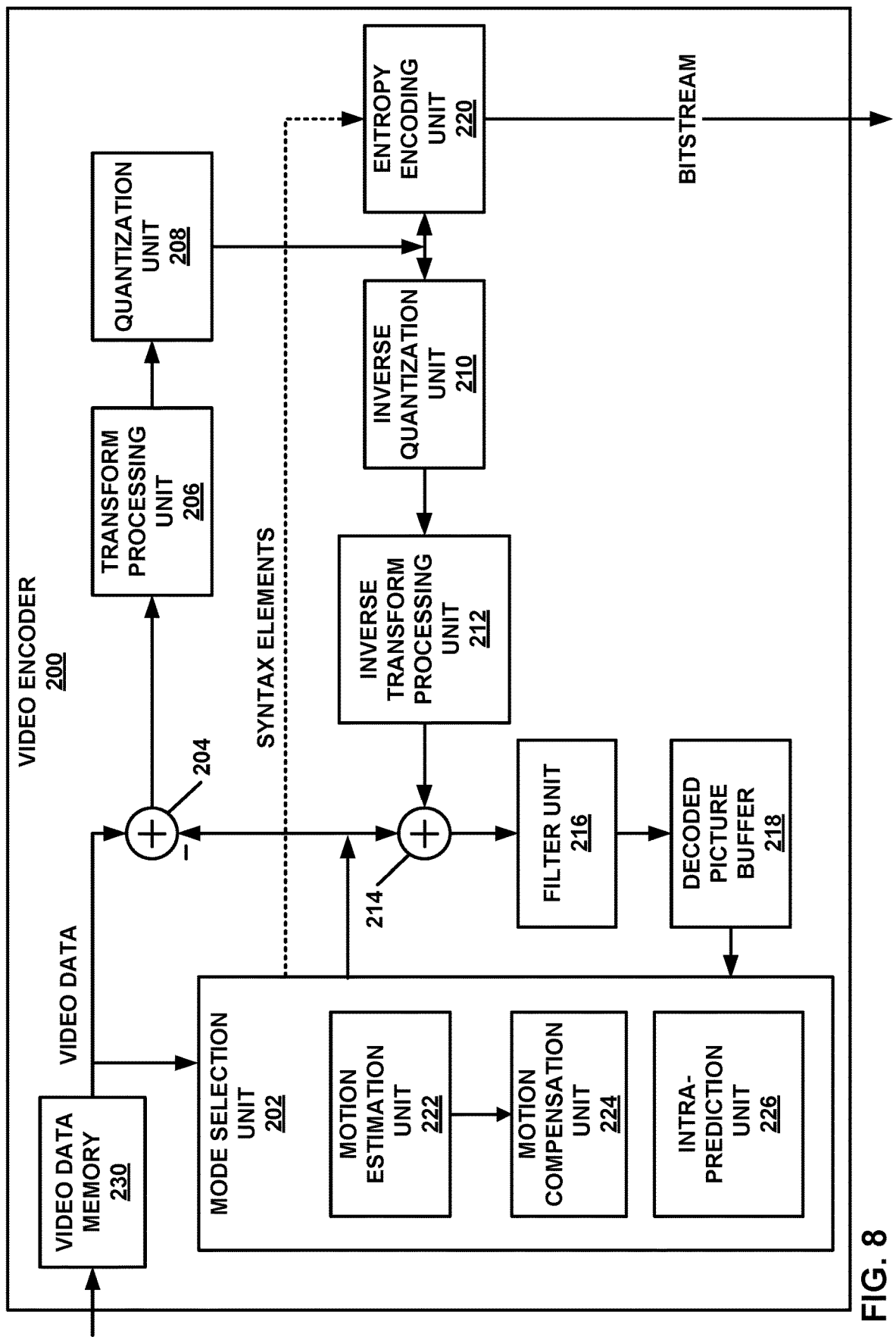
FIG. 8 is a block diagram illustrating an example video encoder that may perform the techniques of this disclosure.

FIG. 8 is a block diagram illustrating an example video encoder 200 that may perform the techniques of this disclosure. FIG. 8 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 8, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 5). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 5 may also provide temporary storage of outputs from the various units of video encoder 200.

The various units of FIG. 8 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 5) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like. In some examples, motion estimation unit 222 and motion compensation unit 224 may be configured to perform affine motion model prediction.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

In accordance with the techniques of this disclosure, mode selection unit 202 may also test affine motion model prediction using, e.g., motion estimation unit 222 and motion compensation unit 224. Mode selection unit 202 may determine a number of control point motion vectors (CPMVs) to use to predict a current block of video data. For example, for 4-parameter affine motion model, mode selection unit 202 may select two CPMVs in any combination from $V_0$, $V_1$, $V_2$, and $V_3$ as shown in FIG. 6.

Thus, although by default the CPMVs for 4-parameter affine motion model are $V_0$ and $V_1$, mode selection unit 202 may instead select at least one of $V_2$ or $V_3$ to use as a CPMV for 4-parameter affine motion model. In such cases, video encoder 200 (e.g., entropy encoding unit 220) may determine motion information of a neighboring block that neighbors a lower half of the current block to either the left or the right of the current block to use to predict the determined CPMVs of $V_2$ or $V_3$. In particular, when $V_2$ is one of the CPMVs, video encoder 200 may determine motion information of one of A0 or A1 (FIG. 6) to use to predict and encode $V_2$. When $V_3$ is one of the CPMVs, video encoder 200 may determine motion information of one of C0 or C1 (FIG. 6) to use to predict and encode $V_3$.

Likewise, for 6-parameter affine motion model, mode selection unit 202 may select three CPMVs in any combination from $V_0$, $V_1$, $V_2$, and $V_3$ as shown in FIG. 6. Although by default the three CPMVs are $V_0$, $V_1$, and $V_2$ for 6-parameter affine motion model, video encoder 200 may select $V_3$ as one of the CPMVs for 6-parameter affine motion model, and select any two of $V_0$, $V_1$, and $V_2$ as the other two CPMVs. Accordingly, video encoder 200 may determine motion information of one of C0 or C1 (FIG. 6) to use to predict and encode $V_3$.

Motion estimation unit 222 may estimate the CPMVs at the determined positions based on a motion search, and provide the CPMVs to motion compensation unit 224. Motion compensation unit 224, in turn, may perform affine motion model inter-prediction using the motion vectors to generate a prediction block for the current block. Motion compensation unit 224 may then provide the prediction block to residual generation unit 204 and reconstruction unit 214.

To encode a CPMV, video encoder 200 (e.g., entropy encoding unit 220, mode selection unit 202, or another unit of video encoder 200) may calculate a motion vector difference (MVD) between the CPMV and the determined motion information (that is, a motion vector, acting as a motion vector predictor) of the neighboring block. The MVD may include a horizontal component representing the difference between the horizontal component of the CPMV and the horizontal component of the motion vector predictor, as well as a vertical component representing the difference between the vertical component of the CPMV and the vertical component of the motion vector predictor. Video encoder 200 may encode the CPMVs with the respective MVDs according to, e.g., affine AMVP mode.

In some examples, video encoder 200 may determine a resolution for the MVD values. The resolution may correspond to a sub-integer pixel precision, e.g., 1/16 of a pixel, 1/8 of a pixel, 1/4 of a pixel, 1/2 of a pixel, full pixel, or four-pixel precision. Video encoder 200 may further ensure that the MVD has the determined resolution, e.g., by rounding the MVD as necessary. Video encoder 200 may determine the resolution as a function of a size of the current block, in some examples.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding blocks and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Figure 9:
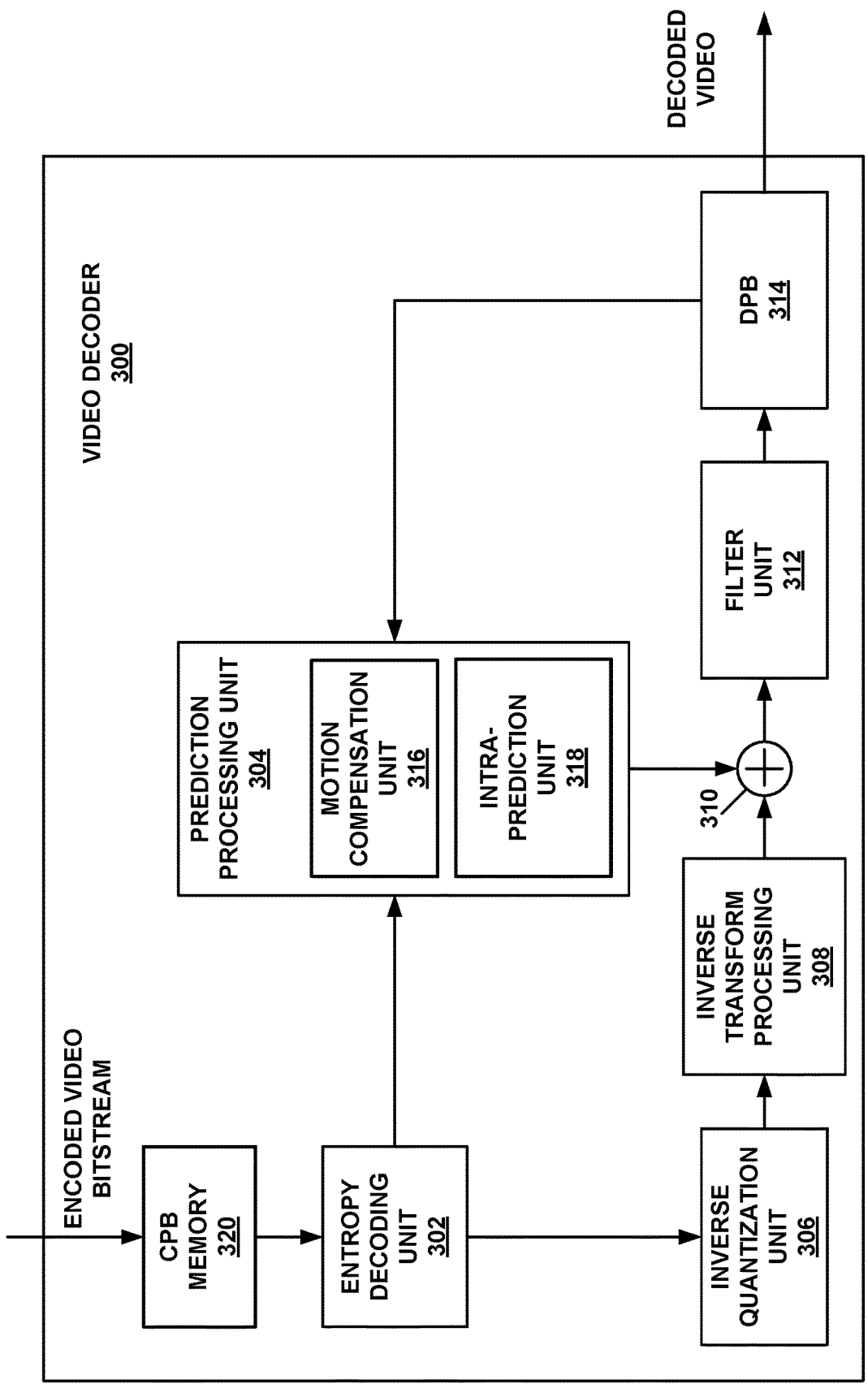
FIG. 9 is a block diagram illustrating an example video decoder that may perform the techniques of this disclosure.

FIG. 9 is a block diagram illustrating an example video decoder 300 that may perform the techniques of this disclosure. FIG. 9 is provided for purposes of explanation and is not limiting on the techniques as broadly exemplified and described in this disclosure. For purposes of explanation, this disclosure describes video decoder 300 according to the techniques of JEM and HEVC. However, the techniques of this disclosure may be performed by video coding devices that are configured to other video coding standards.

In the example of FIG. 9, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 5). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 5). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 9 are illustrated to assist with understanding the operations performed by video decoder 300. The units may be implemented as fixed-function circuits, programmable circuits, or a combination thereof. Similar to FIG. 8, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 8).

In accordance with the techniques of this disclosure, prediction processing unit 304 may receive motion information for a current block indicating that the current block is to be inter-predicted using an affine motion model, e.g., by motion compensation unit 316. Prediction processing unit 304 may determine a number of control point motion vectors (CPMVs) to use to predict a current block of video data. For example, for 4-parameter affine motion model, prediction processing unit 304 may select two CPMVs in any combination from $V_0$, $V_1$, $V_2$, and $V_3$ as shown in FIG. 6.

Thus, although by default the CPMVs for 4-parameter affine motion model are $V_0$ and $V_1$, prediction processing unit 304 may instead select at least one of $V_2$ or $V_3$ to use as a CPMV for 4-parameter affine motion model. In such cases, video decoder 300 (e.g., entropy decoding unit 302, prediction processing unit 304, or motion compensation unit 316) may determine motion information of a neighboring block that neighbors a lower half of the current block to either the left or the right of the current block to use to predict the determined CPMVs of $V_2$ or $V_3$. In particular, when $V_2$ is one of the CPMVs, video decoder 300 may determine motion information of one of A0 or A1 (FIG. 6) to use to predict and encode $V_2$. When $V_3$ is one of the CPMVs, video decoder 300 may determine motion information of one of C0 or C1 (FIG. 6) to use to predict and encode $V_3$.

Likewise, for 6-parameter affine motion model, prediction processing unit 304 may select three CPMVs in any combination from $V_0$, $V_1$, $V_2$, and $V_3$ as shown in FIG. 6. Although by default the three CPMVs are $V_0$, $V_1$, and $V_2$ for 6-parameter affine motion model, video decoder 300 may select $V_3$ as one of the CPMVs for 6-parameter affine motion model, and select any two of $V_0$, $V_1$, and $V_2$ as the other two CPMVs. Accordingly, video decoder 300 may determine motion information of one of C0 or C1 (FIG. 6) to use to predict and encode $V_3$.

Motion compensation unit 316 may decode the CPMVs at the determined positions based on data received from entropy decoding unit 302. Motion compensation unit 316, in turn, may perform affine motion model inter-prediction using the motion vectors to generate a prediction block for the current block. Motion compensation unit 316 may then provide the prediction block to reconstruction unit 310.

To decode a CPMV, video decoder 300 (e.g., entropy decoding unit 302, prediction processing unit 304, or another unit of video decoder 300) may receive a motion vector difference (MVD) representing a difference between the CPMV and the determined motion information (that is, a motion vector, acting as a motion vector predictor) of the neighboring block. The MVD may include a horizontal component representing the difference between the horizontal component of the CPMV and the horizontal component of the motion vector predictor, as well as a vertical component representing the difference between the vertical component of the CPMV and the vertical component of the motion vector predictor. Video decoder 300 may decode the CPMVs with the respective MVDs according to, e.g., affine AMVP mode. In particular, video decoder 300 may add the MVDs to the motion vector predictors of the neighboring blocks to reproduce the CPMVs.

In some examples, video decoder 300 may determine a resolution for the MVD values. The resolution may correspond to a sub-integer pixel precision, e.g., 1/16 of a pixel, 1/8 of a pixel, 1/4 of a pixel, 1/2 of a pixel, full pixel, or four-pixel precision. Video decoder 300 may further ensure that the MVD has the determined resolution, e.g., by rounding the MVD as necessary. Video decoder 300 may determine the resolution as a function of a size of the current block, in some examples.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 8). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 5.

Figure 10:
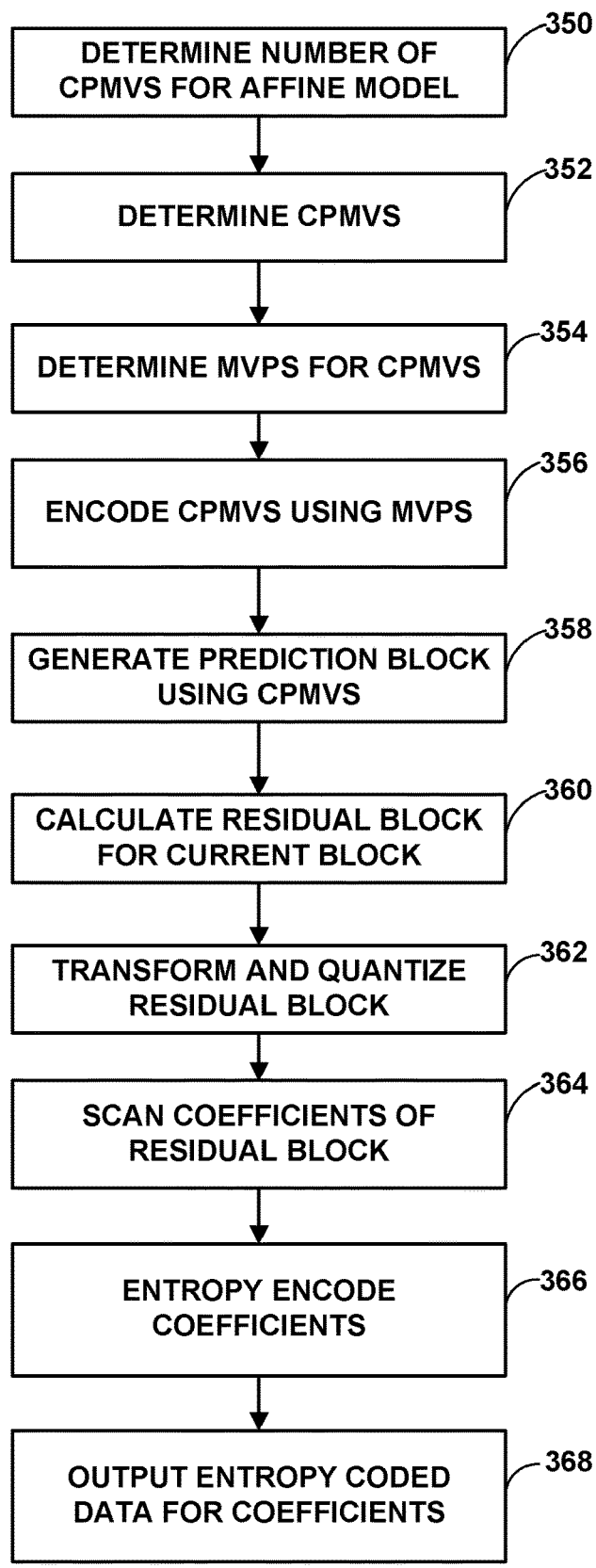
FIG. 10 is a flowchart illustrating an example method for encoding a current block in accordance with the techniques of this disclosure.

FIG. 10 is a flowchart illustrating an example method for encoding a current block in accordance with the techniques of this disclosure. The current block may comprise a current CU. Although described with respect to video encoder 200 (FIGS. 1 and 2), it should be understood that other devices may be configured to perform a method similar to that of FIG. 10.

In this example, video encoder 200 initially determines a number of control point motion vectors (CPMVs) to be used to predict a current block of video data using an affine motion model for inter-prediction (350). Video encoder 200 also determines the CPMVs according to the number (352). For example, for 4-parameter affine motion model, video encoder 200 may determine two CPMVs, and for 6-parameter affine motion model, video encoder 200 may determine three CPVMs. For 4-parameter affine motion model, video encoder 200 may determine any two CPMVs from $V_0$, $V_1$, $V_2$, and $V_3$ (FIG. 6). For 6-parameter affine motion model, video encoder 200 may determine any three CPMVs from $V_0$, $V_1$, $V_2$, and $V_3$ (FIG. 6). In some examples, for 4-parameter affine motion model, video encoder 200 may determine at least one of $V_2$ or $V_3$ (FIG. 6) as one or both of the CPMVs, and for 6-parameter affine motion model, video encoder 200 may determine $V_3$ as one of the CPMVs.

Video encoder 200 also determines motion vector predictors (MVPs) for the CPMVs (354). Video encoder 200 determines motion information of neighboring blocks to the CPMVs to use to predict the CPMVs. For example, when $V_0$ is one of the CPMVs, video encoder 200 may select motion information of one of A2, B2, or B3 (FIG. 6) to use to predict $V_0$. When $V_1$ is one of the CPMVs, video encoder 200 may select motion information of one of B0, B1, or C2 (FIG. 6) to use to predict $V_1$. When $V_2$ is one of the CPMVs, video encoder 200 may select motion information of one of A0 or A1 (FIG. 6) to use to predict $V_2$. When $V_3$ is one of the CPMVs, video encoder 200 may select one of C0 or C1 (FIG. 6) to use to predict $V_3$. Video encoder 200 may then encode the CPMVs using the determined MVPs (356), e.g., using affine AMVP mode. In some examples, video encoder 200 may encode motion vector differences (MVDs) according to affine AMVP using a determined resolution for the MVDs. Video encoder 200 may determine the resolution according to a size of the current block.

Video encoder 200 may then generate a prediction block using the CPMVs (358). In accordance with the techniques of this disclosure, video encoder 200 may predict the block using affine prediction. Video encoder 200 may then calculate a residual block for the current block (360). To calculate the residual block, video encoder 200 may calculate a difference between the original, uncoded block and the prediction block for the current block. Video encoder 200 may then transform and quantize coefficients of the residual block (362). Next, video encoder 200 may scan the quantized transform coefficients of the residual block (364). During the scan, or following the scan, video encoder 200 may entropy encode the coefficients (366). For example, video encoder 200 may encode the coefficients using CAVLC or CABAC.

Video encoder 200 may also entropy encode prediction information, such as an indication that the block is inter-predicted using affine prediction, a number of parameters for the affine motion model, CPMVs to be used in inter-prediction according to the affine motion model, and/or determined neighboring blocks to be used to predict the CPMVs. In some examples, video encoder 200 may simply indicate the neighboring blocks to be used to predict the CPMVs, which may implicitly indicate which CPMVs are to be used. For example, if one of neighboring blocks A0 or A1 is identified, this may act as an implicit indication that $V_2$ is to be used as a CPMV. As another example, if one of neighboring blocks C0 or C1 is identified, this may act as an implicit indication that $V_3$ is to be used as a CPMV. Video encoder 200 may then output the entropy coded data of the block (368).

In this manner, the method of FIG. 10 represents an example of a method of coding video data including determining a number of control point motion vectors to be used to predict a current block of video data using inter-prediction according to an affine motion model; determining motion information of neighboring blocks to the current block to use to predict the control point motion vectors, wherein determining the motion information comprises: when the number of control point motion vectors is two, determining motion information of a neighboring block that neighbors a lower half of the current block to either the left or the right of the current block, or when the number of control point motion vectors is three, determining motion information of a neighboring block that neighbors the lower half of the current block to the right of the current block; coding the control point motion vectors using the determined motion information of the neighboring blocks; generating a prediction block for the current block using the control point motion vectors and using inter-prediction according to the affine motion model; and coding the current block using the prediction block.

Figure 11:
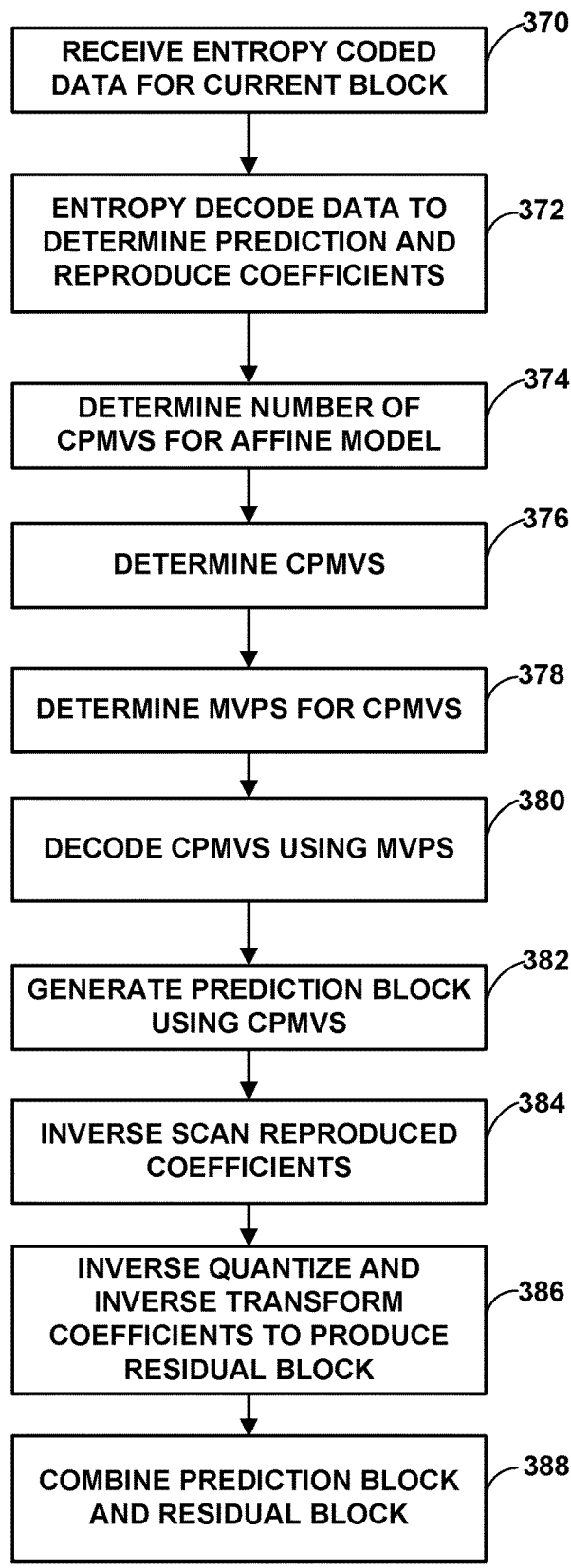
FIG. 11 is a flowchart illustrating an example method for decoding a current block in accordance with the techniques of this disclosure.

FIG. 11 is a flowchart illustrating an example method for decoding a current block in accordance with the techniques of this disclosure. The current block may comprise a current CU. Although described with respect to video decoder 300 (FIGS. 1 and 3), it should be understood that other devices may be configured to perform a method similar to that of FIG. 11.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). The prediction information may include an indication that the block is to be predicted using affine prediction, as well as an indication of a number of control point motion vectors (CPVMs) to be used to predict the current block, locations of the CPMVs, and locations of neighboring blocks from which to retrieve motion information to use to decode the CPMVs.

Accordingly, video decoder 300 may use the decoded data to determine a number of CPMVs to be used to decode the current block for an affine motion model (374). Video decoder 300 also determines the CPMVs according to the number (376). For example, for 4-parameter affine motion model, video decoder 300 may determine two CPMVs, and for 6-parameter affine motion model, video decoder 300 may determine three CPVMs. For 4-parameter affine motion model, video decoder 300 may determine any two CPMVs from $V_0$, $V_1$, $V_2$, and $V_3$ (FIG. 6). For 6-parameter affine motion model, video decoder 300 may determine any three CPMVs from $V_0$, $V_1$, $V_2$, and $V_3$ (FIG. 6). In some examples, for 4-parameter affine motion model, video decoder 300 may determine at least one of $V_2$ or $V_3$ (FIG. 6) as one or both of the CPMVs, and for 6-parameter affine motion model, video decoder 300 may determine $V_3$ as one of the CPMVs. In some examples, video decoder 300 may determine a motion vector difference (MVD) resolution to be used to decode the CPMVs for the current block, e.g., as a function of a size of the current block.

Video decoder 300 also determines motion vector predictors (MVPs) for the CPMVs (378). For example, video decoder 300 may determine the MVPs from entropy decoded data of the bitstream. Video decoder 300 determines motion information of neighboring blocks as the MVPs to the CPMVs to use to predict the CPMVs. For example, when $V_0$ is one of the CPMVs, video decoder 300 may select motion information of one of A2, B2, or B3 (FIG. 6) to use to predict $V_0$. When $V_1$ is one of the CPMVs, video decoder 300 may select motion information of one of B0, B1, or C2 (FIG. 6) to use to predict $V_1$. When $V_2$ is one of the CPMVs, video decoder 300 may select motion information of one of A0 or A1 (FIG. 6) to use to predict $V_2$. When $V_3$ is one of the CPMVs, video decoder 300 may select one of C0 or C1 (FIG. 6) to use to predict $V_3$. Video decoder 300 may then decode the CPMVs using the determined MVPs (356), e.g., using affine AMVP mode. In some examples, video decoder 300 may decode motion vector differences (MVDs) according to affine AMVP using a determined resolution for the MVDs. Video decoder 300 may determine the resolution according to a size of the current block.

Video decoder 300 may then generate a prediction block for the current block using the CPMVs (382), e.g., according to affine motion model inter-prediction as indicated by the prediction information for the current block. Video decoder 300 may then inverse scan the reproduced coefficients (384), to create a block of quantized transform coefficients. Video decoder 300 may then inverse quantize and inverse transform the coefficients to produce a residual block (386). Video decoder 300 may ultimately decode the current block by combining the prediction block and the residual block (388).

In this manner, the method of FIG. 11 represents an example of a method of coding video data including determining a number of control point motion vectors to be used to predict a current block of video data using inter-prediction according to an affine motion model; determining motion information of neighboring blocks to the current block to use to predict the control point motion vectors, wherein determining the motion information comprises: when the number of control point motion vectors is two, determining motion information of a neighboring block that neighbors a lower half of the current block to either the left or the right of the current block, or when the number of control point motion vectors is three, determining motion information of a neighboring block that neighbors the lower half of the current block to the right of the current block; coding the control point motion vectors using the determined motion information of the neighboring blocks; generating a prediction block for the current block using the control point motion vectors and using inter-prediction according to the affine motion model; and coding the current block using the prediction block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   determining a number of control point motion vectors to be used to predict a current block of video data using inter-prediction according to an affine motion model;
   determining motion information of neighboring blocks to the current block to use to predict the control point motion vectors, wherein determining the motion information comprises:
      when the number of control point motion vectors is two, determining motion information of a neighboring block that neighbors a lower half of the current block to either the left or the right of the current block; or
      when the number of control point motion vectors is three, determining motion information of a neighboring block that neighbors the lower half of the current block to the right of the current block;
   determining a resolution for motion vector difference (MVD) values for the control point motion vectors without coding data directly representative of the resolution, wherein determining the resolution comprises determining the resolution as a function of a size of the current block, wherein the size of the current block comprises an input to the function, and wherein determining the resolution comprises:
      calculating an S value for the current block, the S value representing the size of the current block according to one of a width of the current block or a height of the current block; and
      determining the resolution (r) according to the function r=

$$r = \begin{cases} \frac{1}{1 \ll (7 - \log_2 S)}, & S \leq 128 \\ 1, & S > 128 \end{cases};$$

coding the control point motion vectors using the determined motion information of the neighboring blocks, wherein coding the control point motion vectors comprises coding the MVD values for the control point motion vectors having the determined resolution, the MVD values representing differences between the control point motion vectors and the determined motion information of the neighboring blocks;
   generating a prediction block for the current block using the control point motion vectors and using inter-prediction according to the affine motion model; and
   coding the current block using the prediction block.

2. The method of claim 1, wherein the resolution comprises one of 1/16 pixel, 1/8 pixel, 1/4 pixel, 1/2 pixel, full pixel, or four-pixel.

3. The method of claim 1, further comprising rounding motion vector predictors of motion information of the neighboring blocks according to the determined resolution.

4. The method of claim 1, wherein the number of control point motion vectors is equal to two, and wherein determining the motion information of the neighboring blocks comprises determining motion information of a top-left neighboring block and a bottom-right neighboring block.

5. The method of claim 1, wherein the number of control point motion vectors is two, and wherein determining the motion information of the neighboring blocks comprises determining motion information of a bottom-left neighboring block and a top-right neighboring block.

6. The method of claim 1, wherein the number of control point motion vectors is two, and wherein determining the motion information of the neighboring blocks comprises determining motion information of a bottom-left neighboring block and a bottom-right neighboring block.

7. The method of claim 1, wherein the number of control point motion vectors is three, and wherein determining the motion information of the neighboring blocks comprises determining motion information of a top-left neighboring block, a top-right neighboring block, and a bottom-right neighboring block.

8. The method of claim 1, wherein the number of control point motion vectors is three, and wherein determining the motion information of the neighboring blocks comprises determining motion information of a top-left neighboring block, a bottom-left neighboring block, and a bottom-right neighboring block.

9. The method of claim 1, wherein coding the control point motion vectors comprises decoding the control point motion vectors, and wherein coding the current block comprises:
  decoding a residual block for the current block; and
  combining the residual block with the prediction block to generate a decoded version of the current block.

10. The method of claim 1, wherein coding the control point motion vectors comprises encoding the control point motion vectors, and wherein coding the current block comprises:
  calculating differences between the current block and the prediction block to generate a residual block for the current block; and
  encoding the residual block.

11. A method of coding video, the method comprising:
  determining a number of control point motion vectors to be used to predict a current block of video data using inter-prediction according to an affine motion model;
  determining motion information of neighboring blocks to the current block to use to predict the control point motion vectors, wherein determining the motion information comprises:
    when the number of control point motion vectors is two, determining motion information of a neighboring block that neighbors a lower half of the current block to either the left or the right of the current block; or
    when the number of control point motion vectors is three, determining motion information of a neighboring block that neighbors the lower half of the current block to the right of the current block;
  determining a resolution for motion vector difference (MVD) values for the control point motion vectors, wherein determining the resolution comprises determining the resolution as a function of a size of the current block, wherein the size of the current block comprises an input to the function, without coding data directly representative of the resolution, and wherein determining the resolution comprises:
    calculating an S value for the current block, the S value representing the size of the current block according to one of a width of the current block or a height of the current block;
    determining at least one of a first threshold value TH0 for the current block or a second threshold value TH1 for the current block, wherein TH0>TH1;
    determining at least one resolution left shift value of r0, r1, or r2, wherein r0<r1<r2; and determining the resolution as:
    if S>=TH0, determining the resolution as
    $$\frac{1}{1 \ll r0},$$
    wherein << is a bitwise left shift operator;
    if S<=TH1, determining the resolution as
    $$\frac{1}{1 \ll r2};$$
    or
    if TH1<S<TH0, determining the resolution as
    $$\frac{1}{1 \ll r1};$$
  coding the control point motion vectors using the determined motion information of the neighboring blocks, wherein coding the control point motion vectors comprises coding the MVD values for the control point motion vectors having the determined resolution, the MVD values representing differences between the control point motion vectors and the determined motion information of the neighboring blocks;
  generating a prediction block for the current block using the control point motion vectors and using inter-prediction according to the affine motion model; and
  coding the current block using the prediction block.

12. A method of coding video, the method comprising:
  determining a number of control point motion vectors to be used to predict a current block of video data using inter-prediction according to an affine motion model;
  determining motion information of neighboring blocks to the current block to use to predict the control point motion vectors, wherein determining the motion information comprises:
    when the number of control point motion vectors is two, determining motion information of a neighboring block that neighbors a lower half of the current block to either the left or the right of the current block; or
    when the number of control point motion vectors is three, determining motion information of a neighboring block that neighbors the lower half of the current block to the right of the current block;
  determining a resolution for motion vector difference (MVD) values for the control point motion vectors, wherein determining the resolution comprises determining the resolution as a function of a size of the current block, wherein the size of the current block comprises an input to the function, without coding data directly representative of the resolution, and wherein determining the resolution comprises:
    calculating an S value for the current block, the S value representing the size of the current block according to one of a width of the current block or a height of the current block;
    determining a threshold value TH0 for the current block;
    determining at least one resolution left shift value of r0 or r1; and determining the resolution as:
  if S>=TH0, determining the resolution as $$\frac{1}{1 \ll r0};$$

or
  if S<TH0, determining the resolution as $$\frac{1}{1 \ll r1};$$

coding the control point motion vectors using the determined motion information of the neighboring blocks, wherein coding the control point motion vectors comprises coding the MVD values for the control point motion vectors having the determined resolution, the MVD values representing differences between the control point motion vectors and the determined motion information of the neighboring blocks;

generating a prediction block for the current block using the control point motion vectors and using inter-prediction according to the affine motion model; and coding the current block using the prediction block.

13. A method of coding video, the method comprising:
determining a number of control point motion vectors to be used to predict a current block of video data using inter-prediction according to an affine motion model, wherein one of the control point motion vectors comprises an upper-right control point motion vector;

determining motion information of neighboring blocks to the current block to use to predict the control point motion vectors, wherein determining the motion information comprises:
  when the number of control point motion vectors is two, determining motion information of a neighboring block that neighbors a lower half of the current block to either the left or the right of the current block; or
  when the number of control point motion vectors is three, determining motion information of a neighboring block that neighbors the lower half of the current block to the right of the current block;

determining a resolution for motion vector difference (MVD) values for the control point motion vectors, wherein determining the resolution comprises determining the resolution as a function of a size of the current block, wherein the size of the current block comprises an input to the function, without coding data directly representative of the resolution, wherein determining the resolution for the upper-right control point motion vector comprises:
  determining a MVD resolution r1 for an upper-right control point motion vector for the current block according to the formula $$r1 = \begin{cases} \frac{1}{1 \ll (7 - \log_2 W)}, & W \le 128 \\ 1, & W > 128 \end{cases},$$

wherein W is a width of the current block;

coding the control point motion vectors using the determined motion information of the neighboring blocks, wherein coding the control point motion vectors comprises coding the MVD values for the control point motion vectors having the determined resolution, the MVD values representing differences between the control point motion vectors and the determined motion information of the neighboring blocks;

generating a prediction block for the current block using the control point motion vectors and using inter-prediction according to the affine motion model; and coding the current block using the prediction block.

14. The method of claim 13, further comprising determining a MVD resolution r2 for a lower-left control point motion vector for the current block according to the formula $$r2 = \begin{cases} \frac{1}{1 \ll (7 - \log_2 H)}, & H \le 128 \\ 1, & H > 128 \end{cases},$$

wherein H is a height of the current block.

15. A method of coding video data, the method comprising:
determining a number of control point motion vectors to be used to predict a current block of video data using inter-prediction according to an affine motion model;

determining motion information of neighboring blocks to the current block to use to predict the control point motion vectors, wherein determining the motion information comprises:
  when the number of control point motion vectors is two, determining motion information of a neighboring block that neighbors a lower half of the current block to either the left or the right of the current block; or
  when the number of control point motion vectors is three, determining motion information of a neighboring block that neighbors the lower half of the current block to the right of the current block;

determining a resolution for motion vector difference (MVD) values for the control point motion vectors, wherein the control point motion vectors comprise an upper-left control point motion vector of the current block, and wherein determining the resolution for the upper-left control point motion vector further comprises:
determining a width W of the current block; and
determining an MVD resolution r1 for the upper-right control point motion vector of the current block according to the formula $$r1 = \begin{cases} \frac{1}{1 \ll (7 - \log_2 S)}, & W \le 128 \\ 1, & W > 128 \end{cases};$$

coding the control point motion vectors using the determined motion information of the neighboring blocks, wherein coding the control point motion vectors comprises coding the MVD values for the control point motion vectors having the determined resolution, the MVD values representing differences between the control point motion vectors and the determined motion information of the neighboring blocks;

generating a prediction block for the current block using the control point motion vectors and using inter-prediction according to the affine motion model; and coding the current block using the prediction block.

16. A method of coding video data, the method comprising:

determining a number of control point motion vectors to be used to predict a current block of video data using inter-prediction according to an affine motion model;

determining motion information of neighboring blocks to the current block to use to predict the control point motion vectors, wherein determining the motion information comprises:

when the number of control point motion vectors is two, determining motion information of a neighboring block that neighbors a lower half of the current block to either the left or the right of the current block; or when the number of control point motion vectors is three, determining motion information of a neighboring block that neighbors the lower half of the current block to the right of the current block;

determining a resolution for motion vector difference (MVD) values for the control point motion vectors, wherein the control point motion vectors comprise a lower-left control point motion vector of the current block, and wherein determining the resolution for the lower-left control point motion vector further comprises:

determining a height H of the current block; and determining an MVD resolution r2 for the lower-left control point motion vector of the current block according to the formula $$r2 = \begin{cases} \frac{1}{1 \ll (7 - \log_2 S)}, & H \leq 128 \\ 1, & H > 128 \end{cases};$$

coding the control point motion vectors using the determined motion information of the neighboring blocks, wherein coding the control point motion vectors comprises coding the MVD values for the control point motion vectors having the determined resolution, the MVD values representing differences between the control point motion vectors and the determined motion information of the neighboring blocks;

generating a prediction block for the current block using the control point motion vectors and using inter-prediction according to the affine motion model; and coding the current block using the prediction block.

17. A method of coding video data, the method comprising:

determining a number of control point motion vectors to be used to predict a current block of video data using inter-prediction according to an affine motion model;

determining motion information of neighboring blocks to the current block to use to predict the control point motion vectors, wherein determining the motion information comprises:

when the number of control point motion vectors is two, determining motion information of a neighboring block that neighbors a lower half of the current block to either the left or the right of the current block; or when the number of control point motion vectors is three, determining motion information of a neighboring block that neighbors the lower half of the current block to the right of the current block;

determining a resolution for motion vector difference (MVD) values for the control point motion vectors, wherein the control point motion vectors comprise an upper-right control point motion vector, and wherein determining the resolution for the upper-right control point motion vector further comprises:

determining a width W of the current block;

determining at least one of a first threshold value TH0 for the current block or a second threshold value TH1 for the current block, wherein TH0>TH1;

determining at least one resolution left shift value of r0, r1, or r2, wherein r0<r1<r2; and determining a MVD resolution for the upper-right control point motion vector for the current block as:

if W>=TH0, determining the MVD resolution for the upper-right control point motion vector as $$\frac{1}{1 \ll r0},$$

wherein << is a bitwise left shift operator;

if W<=TH1, determining the MVD resolution for the upper-right control point motion vector as $$\frac{1}{1 \ll r2};$$

or if TH1<W<TH0, determining the MVD resolution for the upper-right control point motion vector as $$\frac{1}{1 \ll r1};$$

coding the control point motion vectors using the determined motion information of the neighboring blocks, wherein coding the control point motion vectors comprises coding the MVD values for the control point motion vectors having the determined resolution, the MVD values representing differences between the control point motion vectors and the determined motion information of the neighboring blocks;

generating a prediction block for the current block using the control point motion vectors and using inter-prediction according to the affine motion model; and coding the current block using the prediction block.

18. A method of coding video data, the method comprising:

determining a number of control point motion vectors to be used to predict a current block of video data using inter-prediction according to an affine motion model;

determining motion information of neighboring blocks to the current block to use to predict the control point motion vectors, wherein determining the motion information comprises:

when the number of control point motion vectors is two, determining motion information of a neighboring block that neighbors a lower half of the current block to either the left or the right of the current block; or when the number of control point motion vectors is three, determining motion information of a neighboring block that neighbors the lower half of the current block to the right of the current block;

determining a resolution for motion vector difference (MVD) values for the control point motion vectors, wherein the control point motion vectors comprise an upper-right control point motion vector, and wherein determining the resolution for the upper-right control point motion vector further comprises:
determining a width W of the current block;
determining a threshold value TH0 for the current block;
determining at least one resolution left shift value of r0 or r1, wherein r0<r1; and
determining a MVD resolution for an upper-right control point motion vector for the current block as:
if W>=TH0, determining the resolution as $$\frac{1}{1 \ll r0};$$

or
if W<TH0, determining the resolution as $$\frac{1}{1 \ll r1};$$

coding the control point motion vectors using the determined motion information of the neighboring blocks, wherein coding the control point motion vectors comprises coding the MVD values for the control point motion vectors having the determined resolution, the MVD values representing differences between the control point motion vectors and the determined motion information of the neighboring blocks;
generating a prediction block for the current block using the control point motion vectors and using inter-prediction according to the affine motion model; and
coding the current block using the prediction block.

19. A device for coding video data, the device comprising:
a memory configured to store video data; and
one or more processors implemented in circuitry and configured to:
determine a number of control point motion vectors to be used to predict a current block of video data using inter-prediction according to an affine motion model;
determine motion information of neighboring blocks to the current block to use to predict the control point motion vectors, wherein to determine the motion information, the one or more processors are configured to:
when the number of control point motion vectors is two, determine motion information of a neighboring block that neighbors a lower half of the current block to either the left or the right of the current block; or
when the number of control point motion vectors is three, determine motion information of a neighboring block that neighbors the lower half of the current block to the right of the current block;
determine a resolution for motion vector difference (MVD) values for the control point motion vectors without coding data directly representative of the resolution, wherein the one or more processors are configured to determine the resolution as a function of a size of the current block, wherein the size of the current block comprises an input to the function, and wherein to determine the resolution, the one or more processors are configured to:
calculate an S value for the current block, the S value representing the size of the current block according to one of a width of the current block or a height of the current block; and
determine the resolution (r) according to the function r=

$$\begin{cases} \frac{1}{1 \ll (7 - \log_2 S)}, & S \le 128 \\ 1, & S > 128 \end{cases};$$

code the control point motion vectors using the determined motion information of the neighboring blocks, wherein to code the control point motion vectors, the one or more processors are configured to code the MVD values for the control point motion vectors having the determined resolution, the MVD values representing differences between the control point motion vectors and the determined motion information of the neighboring blocks;
generate a prediction block for the current block using the control point motion vectors and using inter-prediction according to the affine motion model; and
code the current block using the prediction block.

20. The device of claim 19, wherein the number of control point motion vectors is equal to two, and wherein the neighboring block comprises a bottom-left neighboring block or a bottom-right neighboring block.

21. The device of claim 19, wherein the number of control point motion vectors is equal to three, and wherein the neighboring block comprises a bottom-right neighboring block.

22. A non-transitory computer-readable storage medium having stored thereon instructions that, when executed, cause a processor to:
determine a number of control point motion vectors to be used to predict a current block of video data using inter-prediction according to an affine motion model;
determine motion information of neighboring blocks to the current block to use to predict the control point motion vectors, wherein the instructions that cause the processor to determine the motion information comprise instructions that cause the processor to:
when the number of control point motion vectors is two, determine motion information of a neighboring block that neighbors a lower half of the current block to either the left or the right of the current block; or
when the number of control point motion vectors is three, determine motion information of a neighboring block that neighbors the lower half of the current block to the right of the current block;
determine a resolution for motion vector difference (MVD) values for the control point motion vectors without coding data directly representative of the resolution, wherein the instructions that cause the processor to determine the resolution comprise instructions that cause the processor to determine the resolution as a function of a size of the current block, wherein the size of the current block comprises an input to the function, and wherein the instructions that cause the processor to determine the resolution comprise instructions that cause the processor to:
calculate an S value for the current block, the S value representing the size of the current block according to one of a width of the current block or a height of the current block; and
determine the resolution (r) according to the function r=

$$r = \begin{cases} \frac{1}{1 \ll (7 - \log_2 S)}, & S \leq 128 \\ 1, & S > 128 \end{cases};$$

code the control point motion vectors using the determined motion information of the neighboring blocks, wherein the instructions that cause the processor to code the control point motion vectors comprise instructions that cause the processor to code the MVD values for the control point motion vectors having the determined resolution, the MVD values representing differences between the control point motion vectors and the determined motion information of the neighboring blocks;
generate a prediction block for the current block using the control point motion vectors and using inter-prediction according to the affine motion model; and
code the current block using the prediction block.

23. A device for coding video data, the device comprising:
means for determining a number of control point motion vectors to be used to predict a current block of video data using inter-prediction according to an affine motion model;
means for determining motion information of neighboring blocks to the current block to use to predict the control point motion vectors, wherein determining the motion information comprises:
means for determining, when the number of control point motion vectors is two, motion information of a neighboring block that neighbors a lower half of the current block to either the left or the right of the current block; or
means for determining, when the number of control point motion vectors is three, motion information of a neighboring block that neighbors the lower half of the current block to the right of the current block;
means for determining a resolution for motion vector difference (MVD) values for the control point motion vectors without coding data directly representative of the resolution, wherein the means for determining the resolution comprises means for determining the resolution as a function of a size of the current block, wherein the size of the current block comprises an input to the function, and wherein the means for determining the resolution comprises:
means for calculating an S value for the current block, the S value representing the size of the current block according to one of a width of the current block or a height of the current block; and
means for determining the resolution (r) according to the function r=

$$r = \begin{cases} \frac{1}{1 \ll (7 - \log_2 S)}, & S \leq 128 \\ 1, & S > 128 \end{cases};$$

means for coding the control point motion vectors using the determined motion information of the neighboring blocks, wherein the means for coding the control point motion vectors comprises means for coding the MVD values for the control point motion vectors having the determined resolution, the MVD values representing differences between the control point motion vectors and the determined motion information of the neighboring blocks;
means for generating a prediction block for the current block using the control point motion vectors and using inter-prediction according to the affine motion model; and
means for coding the current block using the prediction block.

* * * * *